Patented Nov. 26, 1946

2,411,661

UNITED STATES PATENT OFFICE 2,411,661

4-AMINOBENZENE-SULFONE-CARBAMIC ACID DERIVATIVE

Henry Martin, Basel, Rudolf Hirt, Riehen, and Alfred Staub, Basel, Switzerland, assignors to the firm J. R. Geigy A. G., Basel, Switzerland, a corporation of Switzerland No Drawing. Application January 25, 1945, Serial No. 574,632. In Switzerland December 23, 1939

1 Claim. (Cl. 260—397.7)

It has been found that valuable 4-aminobenzene-sulfone-carbamic acid derivatives are obtained by causing sulfonamides of the aromatic series or their salts respectively, which contain, in 4-position, a nitrogen-containing group or a substituent replaceable by such a group, to react with reactive carbamic acid derivatives and converting eventually the 4-positioned substituent into an amino group.

On the other hand, it is also possible to cause sulfone-halides of the aromatic series containing, in 4-position, a nitrogen-containing group or a substituent replaceable by such a group to react with reactive urea derivatives such as ethers of pseudo urea, to saponify the pseudo urea ether derivative, and to eventually convert the 4-positioned substituent into an amino group.

As reactive carbamic acid derivatives, which may be used for the condensation, especially the anhydrides, halides, esters or amides of carbamic acid, are suitable. As anhydrides of carbamic acid may be enumerated cyanic acid or its salts, whereas as halides the carbamic acid halides may be employed. As esters the urethanes may be used, while as amides urea or the ethers of its isoform or nitro-urea are suitable.

As sulfonic acid amides or sulfonic acid halides of the aromatic series, which in 4-position contain a nitrogen-containing group or a substituent replaceable by such a group, may be understood benzene sulfonic acid derivatives possessing in 4-position for example a free amino group, a benzylamino group, an acylamino group, a nitro, azo, azomethine, hydroxyl or carboxyl group or derivatives thereof or a halogen atom.

A suitable method for the preparation of 4-amino-benzene-sulfone-carbamic acid derivatives consists for instance in causing 4-acetylaminobenzene-sulfonamide to react with potassium cyanate thus giving 4-acetylaminobenzene-sulfone urea and in subsequently saponifying this product to the aminobenzene-sulfone urea. When using 4-nitrobenzene-sulfonamide, instead of 4-acetylaminobenzene-sulfonamide, 4-nitrobenzene-sulfone-urea is obtained; by reduction of this latter compound there will be obtained 4-aminobenzene-sulfone-urea. By condensation of acetyl-sulfanilamide with carbamic acid chloride the acetylaminobenzene-sulfone-urea is produced; also in this case the 4-nitrobenzene-sulfonamide may be used. When combining the potassium salt of acetyl-sulfanilamide with urethane and heating this mixture there will also be obtained 4-acetylaminobenzene-sulfone-urea. The same compound can be produced by interaction of the potassium salt of acetyl-sulfanilamide with urea or with nitro-urea. 4-acetylaminobenzene-sulfone-urea - O -methyl - ether can be made from 4-acetylaminobenzene-sulfochloride and urea-O-methyl ether. By means of hydrogen halide acids the 4-acetylaminobenzene-sulfone-urea is obtained which is converted in the known manner into the amino compound.

All these interactions can, in the most cases, be carried out directly or, if necessary, by the use of solvents or diluents. Often any addition of condensation agents or catalysts may be of importance for an accelerated or smooth course of the reaction. Thus it will be advantageous to work, e. g. for certain interactions, in the presence of alkali- or earth-alkali-salts or -hydroxides or of other suitable salts reacting in a basic manner or of organic tertiary bases, like trimethylamine, dimethylaniline, pyridine or formylmethylaniline, etc.

If according to the above-mentioned reaction sequences compounds are obtained which contain in p-position to the sulfonamide group other substituents than the amino group, for example the benzylamino, acylamino, nitro, azo, azomethine or hydroxyl group, halogen, the carboxyl group or derivatives thereof or the like, usual known methods can be applied for the formation of the free amino group, such as reduction, saponification, exchange of hydroxyl and halogen to the amino group, further decomposition methods according to Hofmann and Curtius and the like.

4-aminobenzene-sulfone-urea is a valuable medicinal and therapeutical substance against infection maladies.

The invention will now be described by way of the following examples, without being limited thereto. The parts are by weight.

Example 1

25 parts of 4-acetylaminobenzene-sulfamide are heated under reflux for 4 to 5 hours with 15 parts of potassium cyanate, 95 parts of alcohol and with 15 parts of water. Thus the potassium salt of the 4-acetylamino-benzene-sulfo-urea is obtained, the same being filtered off, dissolved in dilute caustic potash lye and saponified by a slight heating. By acidification the 4-aminobenzene-sulfo-urea is precipitated. It is filtered and recrystallised from alcohol. Melting point 158°–160° C. under decomposition.

Example 2

10 parts of 4-nitrobenzene-sulfamide in 30 parts of alcohol and 5 parts of water are heated under reflux for 8 hours with 4.5 parts of potassium cyanate. After cooling the potassium salt of the 4-nitrobenzene-sulfo-urea is obtained, which is filtered off and reduced in a catalytical manner. The thus obtained 4-aminobenzene-sulfo-urea is purified by recrystallisation from alcohol; M. P. 158°–160° C. under decomposition.

Example 3

24 parts of the sodium salt of acetyl-sulfanilic acid amide are suspended in 100 parts of benzene and heated to 60°–65° C. While thoroughly stirring this mixture at the said temperature, a solution of 10.5 parts of carbamic acid chloride in 20 parts of benzene is allowed to drop thereinto. Then the mixture is kept, while stirring for several additional hours, at 60°–65° C., whereupon the benzene is distilled off. The residue is dissolved in a cold dilute caustic soda lye, then freed from any insoluble matters and again precipitated by acidification with acetic acid. The 4-acetylaminobenzene-sulfo-urea thus obtained is saponified by heating its solution to 50° C. in a dilute caustic soda lye and the p-aminobenzene-sulfo-urea is precipitated by acidification. M. P. 158°–160° C. under decomposition.

Example 4

20 parts of nitrobenzene-sulfamide are suspended in 100 parts of dry dioxane. While cooling with ice, a solution of 15 parts of pyridine in dioxane and a solution of 10 parts of carbamic acid chloride in 10 parts of dioxane are simultaneously caused to drop into the said suspension. Then the whole is heated to boiling for 4 hours and subsequently the greatest part of dioxane is distilled off. The residue is poured into dilute hydrochloric acid, whereby the raw nitrobenzene-sulfo-urea is precipitated. By dissolving the same in a dilute sodium carbonate solution and by filtration and subsequent acidification of the filtrate it can be recovered in a pure form of melting point 198°–200° C.

By catalytical hydrogenation of the nitro compound there is obtained p-aminobenzene-sulfo-urea melting at 158°–160° C. under decomposition.

Example 5

71 parts of the sodium salt of acetyl-sulfanilamide are heated to 100° C. with 30 parts of urethane until the splitting off of alcohol is complete. The resulting melt is dissolved in 2000 parts of water and, after addition of 30 parts of concentrated caustic soda lye, maintained for 1 hour at 50° C. The filtered solution is neutralised with acetic acid, whereby 4-amino-benzene-sulfo-urea is separated in a crystalline form. Its melting point is 158°–160° C.

Example 6

14 parts of urea, 50 parts of the potassium salt of acetyl-sulfanilamide and 16 parts of glycol-monomethyl ether are heated to 100° C. until any development of ammonia has ceased. The melt is powdered after cooling, dissolved in dilute caustic soda lye, some insoluble matters are filtered off and the 4-acetylaminobenzene-sulfo-urea is saponified. The 4-aminobenzene-sulfo-urea is obtained from the filtered solution by acidifying the latter. M. P. 158°–160° C. under decomposition.

Example 7

10 parts of 4-acetylaminobenzene-sulfamide and 10 parts of nitro-urea are dissolved in 100 parts of alcohol and treated with a solution of 6 parts of sodium carbonate in 20 parts of water. After a boiling for 6–8 hours under reflux the alcohol is distilled off and the residue dissolved in caustic soda lye. By heating the acetyl group is split off and the 4-aminobenzene-sulfo-urea precipitated by acidifying.

This application is a continuation-in-part application to our co-pending application Ser. No. 371,056 filed on December 20, 1940.

What we claim is:

The condensation product of the formula

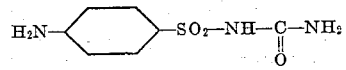

being a colorless compound of excellent therapeutic properties and having the melting point of 158°–160° C.

HENRY MARTIN.
RUDOLF HIRT.
ALFRED STAUB.